United States Patent [19]

Butler

[11] 3,962,206

[45] June 8, 1976

[54] GEL CHROMATOGRAPHY PROCESS FOR FRACTIONATING IONIC POLYMERS
[75] Inventor: George B. Butler, Gainesville, Fla.
[73] Assignee: The Board of Regents of the State of Florida, Fla.
[22] Filed: July 19, 1974
[21] Appl. No.: 489,889

[52] U.S. Cl. .............................. 260/96 R; 210/24; 260/2 R; 260/89.7 S; 260/93.5 A
[51] Int. Cl.² .......................................... C08F 6/04
[58] Field of Search......... 260/93.5 A, 96 R, 89.7 S, 260/2 R; 210/24 C; 450/765.5

[56] References Cited
UNITED STATES PATENTS
2,462,564   2/1949   Skees.................................. 260/96

R26,934   8/1970   Mosbach........................... 260/29.6

OTHER PUBLICATIONS

Polymer Fractionation, Cantow, pp. 124–125 (1967).

*Primary Examiner*—Stanford M. Levin
*Attorney, Agent, or Firm*—Dennis P. Clarke; Harold L. Stowell

[57] ABSTRACT

A gel chromatographic method of fractionating ionic polymer systems comprising passing the system through a gel chromatography bed of ionic polymer wherein the charge on the gel polymer is identical to the charge on the ionic polymer to be fractionated.

20 Claims, 8 Drawing Figures

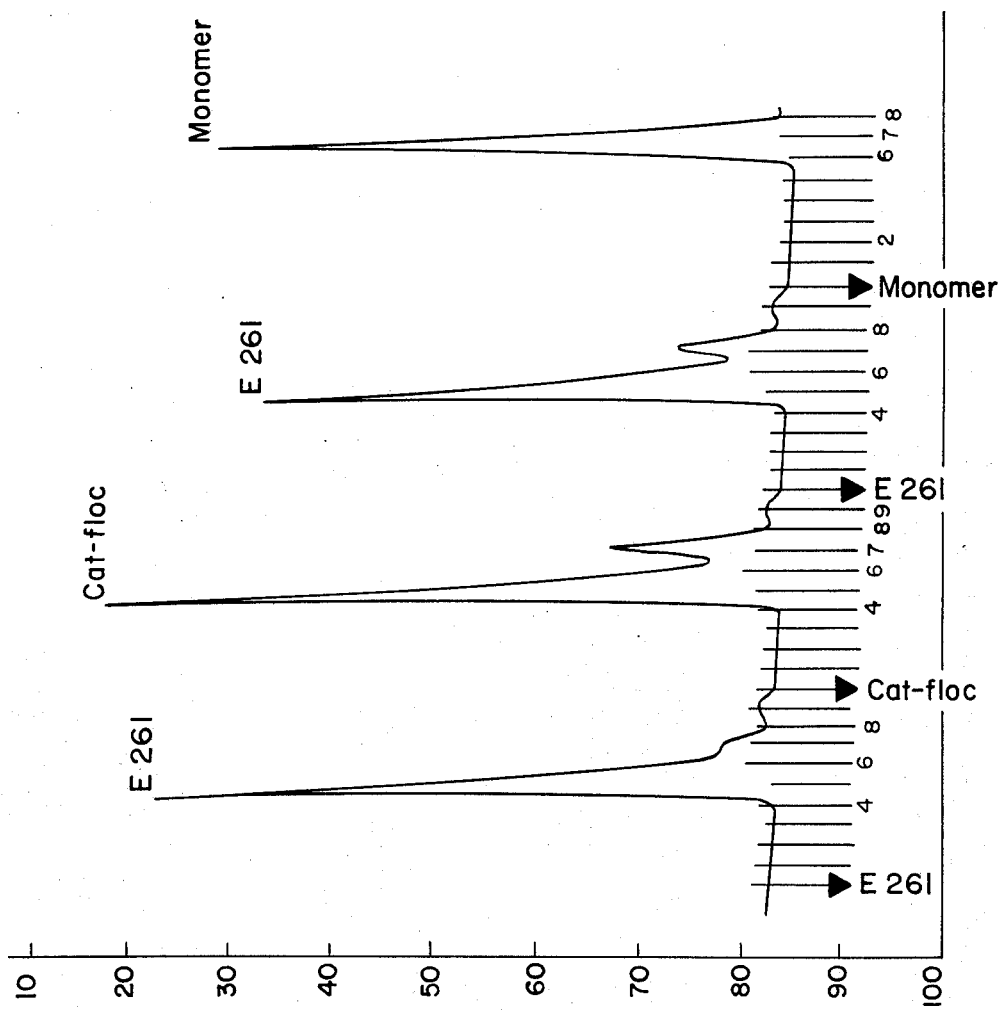

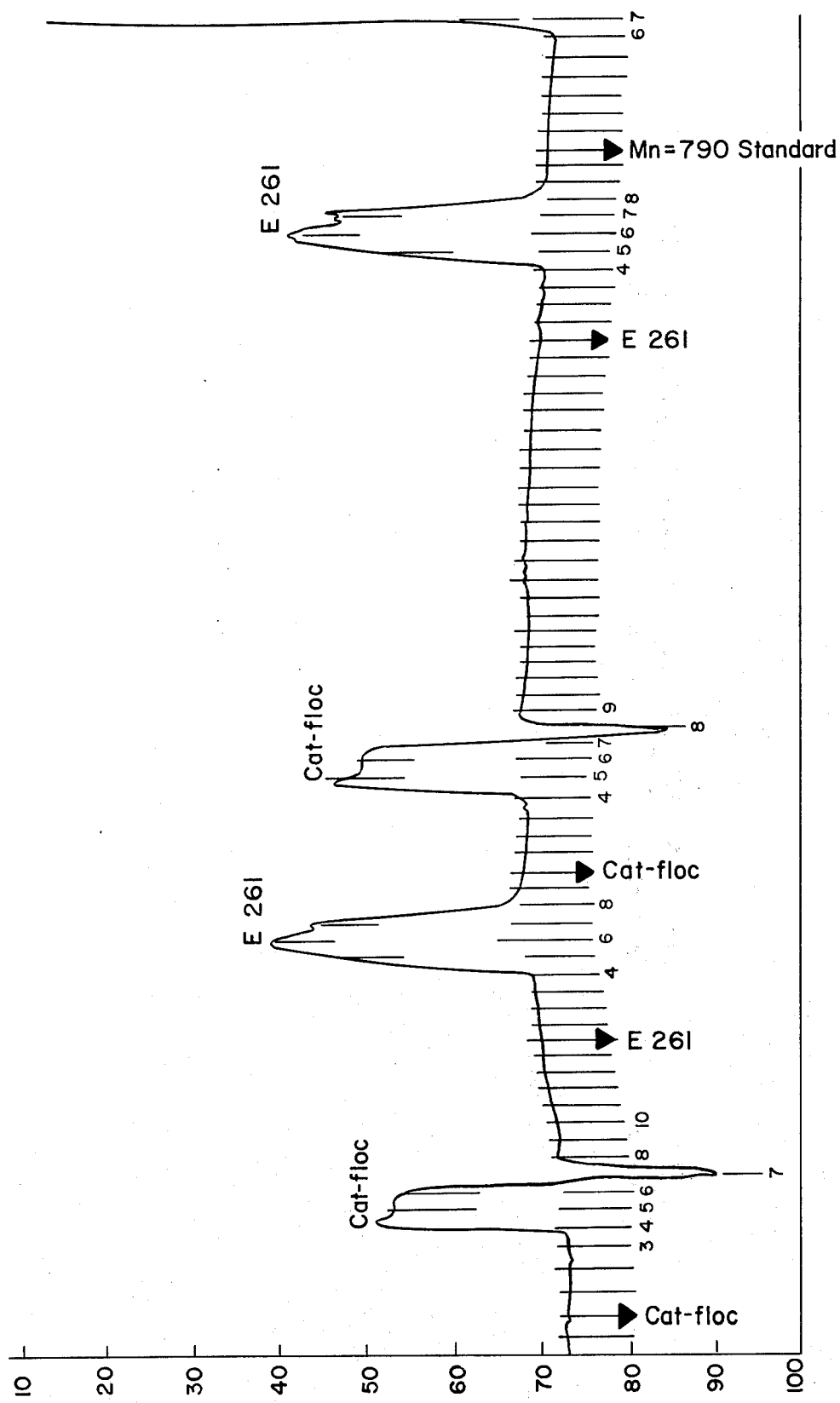

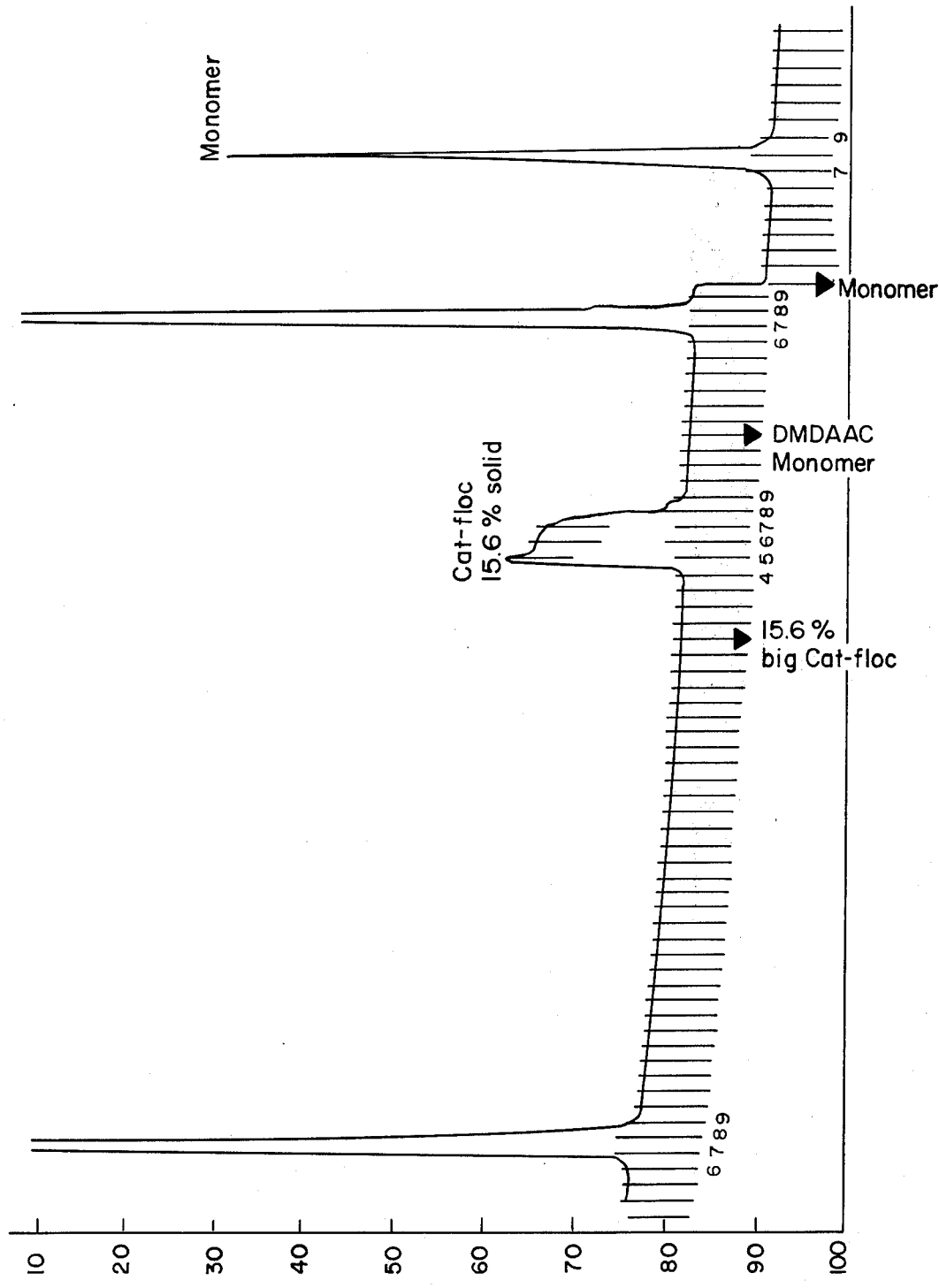

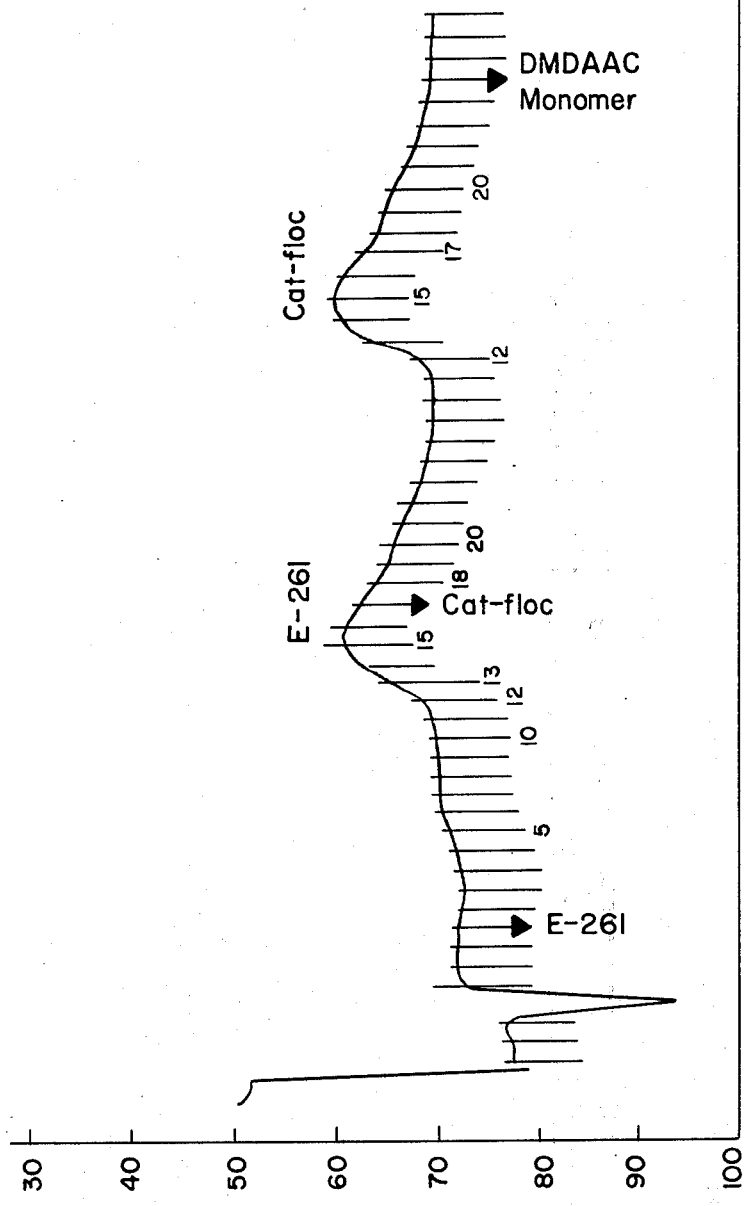

3 ft. Column of Amberlite 938, 904 & 900 Combined in Series

GEL CHROMATOGRAPHY PROCESS FOR FRACTIONATING IONIC POLYMERS

BACKGROUND OF THE INVENTION

Gel chromatography methods for fractionating systems having varying molecular weights are well known.

The method finds widespread utility in the area of fractionating polymer systems of diverse molecular weight. A bed or mass of solvent swollen polymer (hereinafter referred to as the "gel") is provided. Normally, the gel comprises a solvent swollen polymer, e.g., styragel, wherein the gel consists mainly of an uncharged water-insoluble polymer which is inert with regard to the substances to be separated and capable of swelling in an organic solvent medium. The gel is also capable of selectively and/or preferentially separating substances from the solution to be fractionated so that substances with different molecular weights or sizes are distributed differently between the gel and the surrounding solution owing to their different ability to penetrate into the gel, which is in turn dependent upon their molecular weights or sizes.

An organic solvent solution of the system to be fractionated is passed through the mass or bed of gel.

The medium in which the gel is swollen is displaced from the gel bed as the solution of material to be fractionated is fed thereto. The separating capacity of the gel is dependent on the molecular weight or size of the substances to be separated and on the size of the pores or meshes in the three-dimensional network of the gel itself. The higher molecular weight or larger molecules, incapable of penetrating the gel, remain in solution and pass through the interstices of the gel without penetration. The smaller or lower molecular weight molecules penetrate into the gel, dependent upon the size of the pores or meshes therein, and are temporarily taken up thereby. Stated differently, the larger or higher molecular weight molecules remain outside the gel in the solvent in which they were introduced to the gel bed. The smaller or lower molecular weight molecules are temporarily trapped in the interior solvent with which the gel was swollen, inside the porous gel. It is to be understood that the separation is based upon a molecular sieve-type mechanism rather than on a sorption of the fraction into the gel.

Given a gel bed of a certain height, the larger or higher molecular weight molecules will tend to be concentrated at the bottom, carried down by the solvent in which they were introduced. The lighter or smaller molecules will tend to penetrate into the gel at a higher level, thereby achieving a chromatographic fractionation. Obviously, the broader the pore size distribution of the gel bed, the broader the range of molecular weight fractions that can be separated.

Separation can be achieved by feeding an elution liquid into the bed to displace the solution introduced into the bed and the internal solvent with which the gel was swollen. The larger or higher molecular weight particles will be eluted first since they have not fully penetrated the gel. The smaller molecular weight molecules temporarily trapped within the gel will be eluted later, thereby achieving substantially complete separation of the diverse molecular weight fractions.

The above-described gel chromatography method has proved to be very useful for the fractionation of polymers. The method has been used to determine the molecular weight distribution of various polymer systems or for the preparation of fractions of polymer systems with well-defined molecular weight distributions. Because of the high resolving power, speed and possibility of a high degree of automation, gel permeation chromatography is the most promising method for the fractionation of polymers both on an analytical scale and on a preparative scale.

Although the gel permeation chromatography method has been applied to solutions of polymers, no satisfactory method has heretofore been proposed for the fractionation of so-called ionic polymers without altering the structure of the polymer by an ion exchange or other chemical or physical process prior to the fractionation.

Moreover, no system has been heretofore proposed which enables the use of aqueous solvents or elution liquids on a practical scale.

It is an object of the invention to provide a method for the fractionation of the diverse molecular weight fractions of a linear ionic polymer system which does not require the alteration of the structure or chemistry of the ionic polymer and which is adapted for the use of aqueous solvents and elution liquids.

SUMMARY OF THE INVENTION

The invention resides in a gel chromatographic method of fractionating the diverse molecular weight fractions of a polymer system containing ionic functional groups by passing the polymer system through a gel chromatography bed of ionic polymer wherein the polymer is one containing ionic functional groups having the same charge as those in the polymer system to be fractionated.

DETAILED DESCRIPTION OF THE INVENTION

The polymers susceptible of fractionation by the method of the invention include those ionic polymers comprising a backbone or polymer matrix structure containing functional ionic groups such as quaternary ammonium, phosphonium, sulfonium, ammonium, iodonium, pyryllium, sulfonate, phosphate, phosphite, carboxylate, etc. These ionic polymers are generally water soluble or soluble in aqueous electrolyte media and normally contain numerous diverse molecular weight fractions.

Generally, the ionic polymers to be fractionated are linear ionic polymers which include the linear polymers of branched monomers. Slightly cross-linked ionic polymers are also susceptible of separation. The degree of cross-linking is dependent on the effect thereof on the solubility of the polymers. If cross-linking is too pronounced, the polymers are rendered insoluble in suitable media for gel chromatographic methods.

It will be understood that since most ionic polymers are readily water-soluble, the method of the invention enables the use of aqueous solvents and elution liquids.

The invention is predicated on the discovery that the molecular weight fractions of an ionic polymer system can be fractionated by conventional gel chromatographic methods, utilizing as the gel a polymer containing ionic functional groups having the same charge as those in the polymer system to be fractionated.

Suitable gel polymers include the water insoluble and/or cross-linked ionic polymers consisting of a backbone or matrix structure, suitably cross-linked or otherwise rendered water insoluble, containing ionic functional substituents. Many of these so-called "ion exchange resins" are suitable for use in the method of the invention.

The only prerequisites are that the polymer be substantially water insoluble, porous and solvent-swellable to produce a gel mass through which the polymer system to be fractionated can be passed.

It is a critical feature of the method of the invention that the charge on the functional group of the gel polymer be identical to the charge on the functional groups of the polymer system to be fractionated. By "charge on the functional group" is meant the charge on the stationary functional substituent and not the charge of the mobile salt-forming or co-ion. Thus, the charge on the functional group of a linear polymer system containing quaternary ammonium substituents would be positive, thereby rendering the functional group cationic. Although the functional substituent might also contain, for example, a chloride ion in association with the quaternary amine cationic substituent, the charge referred to on the functional group is positive.

On the other hand, a polymer system containing carboxylate substituents would have a negative charge, thereby rendering the functional substituent anionic, notwithstanding that the functional substituent is present therein as a sodium salt.

It is emphasized that the only limitation on the method of the invention is that the charge on the ionic site of the ionic polymer to be fractionated be the same as that of the functional group of the gel resin. Thus, it is within the scope of the invention to utilize a gel resin containing a quaternary ammonium functional group to fractionate ionic polymers containing phosphonium, ammonium, iodonium, pyryllium or other positively charged ionic functional cites. It is also within the scope of the invention to utilize gels containing negatively charged functional sites, e.g., sulfonate to fractionate ionic polymers containing sulfonate, phosphate, phosphite, carboxylate or other negatively charged ionic functional groups.

The gel resin material is selected according to the intended fractionation process. Such factors as the diversity of the molecular weight fractions, filtering speed, etc., must be taken into account. Thus, the chemical nature and porosity of the gel resin selected will depend to a large extent upon the nature of the linear ionic polymer system to be fractionated.

Conventional gel permeation chromatographic principles are utilized in the practice of the method of the invention with the exception that the gel resin is selected such that the charge on the functional group thereof is identical to the charge on the functional groups of the ionic polymer to be separated.

Generally, the gel resin is selected such that it is water-swellable but substantially insoluble in aqueous media due to cross-linking.

The ionic polymers to be separated are generally water soluble or are soluble in aqueous electrolyte solutions. In the latter case, care must be taken to insure that the gel resin employed is not soluble therein. In those instances where the ionic polymers are water or aqueous media-insoluble, suitable polar solvents may be employed in which the gel resins are insoluble.

Conventional elution techniques may be employed to elute the ionic polymer fractions contained within the gel bed. Normally an elution liquid of 0.5–1.5N KCl is employed.

Such factors as gel bed height, area, filtering speed, etc., are readily determinable by those skilled in the art.

The following examples were conducted utilizing a Waters Associates Gel Permeation Chromatograph GPC 300. Standard ⅜ inch O.D., 3 ft. long stainless steel analytical columns were packed with the indicated gel resins. Column efficiencies were about 100 plates per ft.

EXAMPLE 1

Three rigid macroporous Amberlite (Rohm and Haas Company) ion exchange resins having controlled pore size distribution, containing the quaternary ammonium chloride function and having the following descriptions were employed:

1. Amberlite 900, pore size 40–800 A (mostly 40–200 A).
2. Amberlite 904, pore size 100–2500 A (mostly 90–500 A).
3. Amberlite 938, pore size 8,000–30,000 A.

OPERATIONAL CONDITIONS:

1. Solvent: 0.8 N aq. KCl solution
2. Flow rate: 1.3 ml./min.
3. Sample concentration: 0.2 W/V%
4. Sensitivity: 4x

LINEAR IONIC POLYMER SAMPLES FOR FRACTIONATION:

1. Poly(dimethyldiallyl) ammonium chloride (E-261, Calgon Corporation).
2. Poly(dimethyldiallyl) ammonium chloride (Cat-Floc, No. P112-115 Calgon Corporation).
3. Dimethyldiallyl ammonium chloride monomer.

Figure 1A:
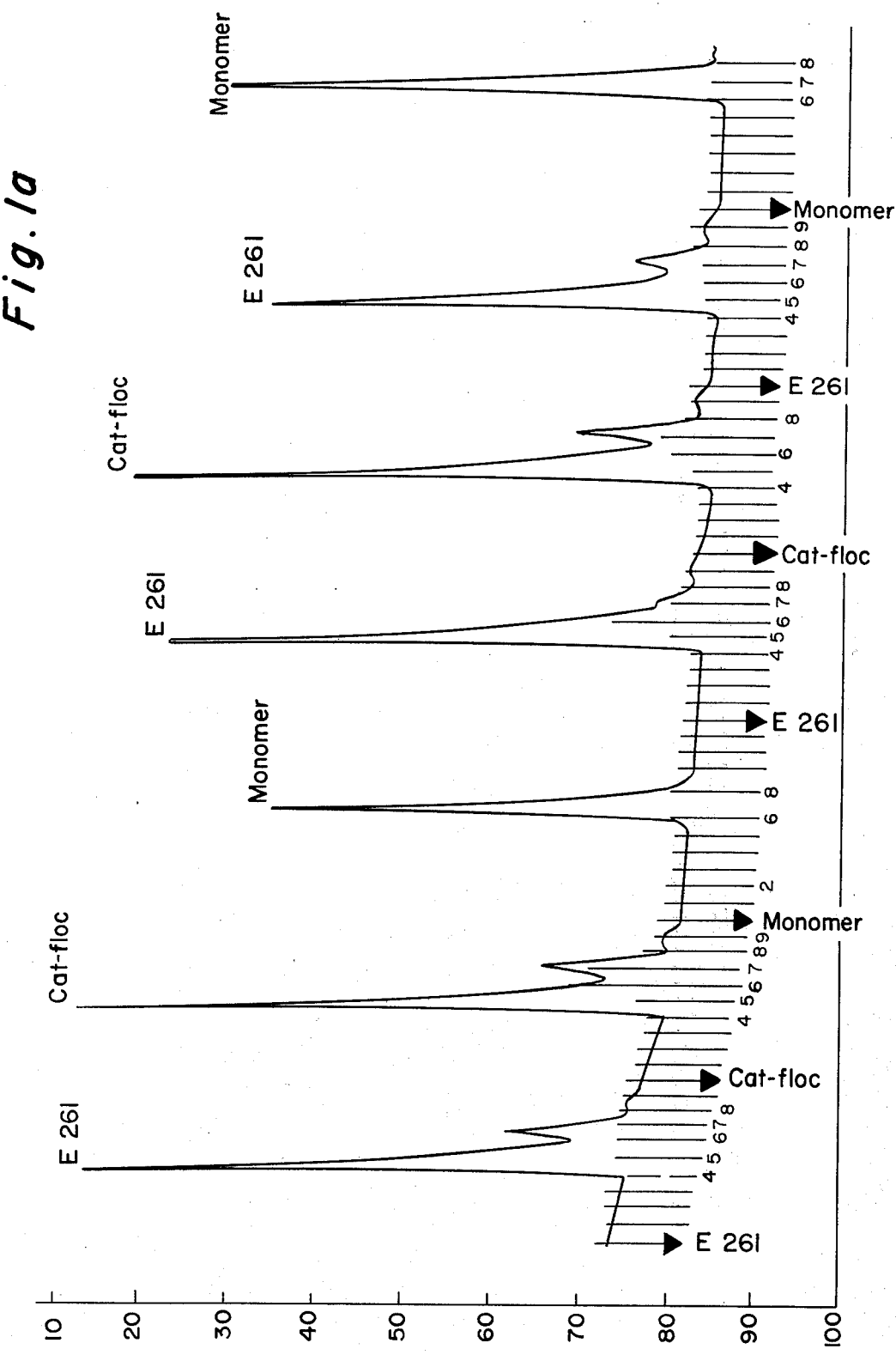
FIGS. 1–4 are chromatograms showing the results of the following non-limiting examples.

RESULTS:

1. Amberlite 900 column. Both samples E-261 and P112-115 registered two sharp peaks. The major peaks centered around 5.0 count, with small peaks at 7.3 count. The latter peak was identified as monomer impurity in the samples. (See FIG. 1a and 1b).

Figure 2B:
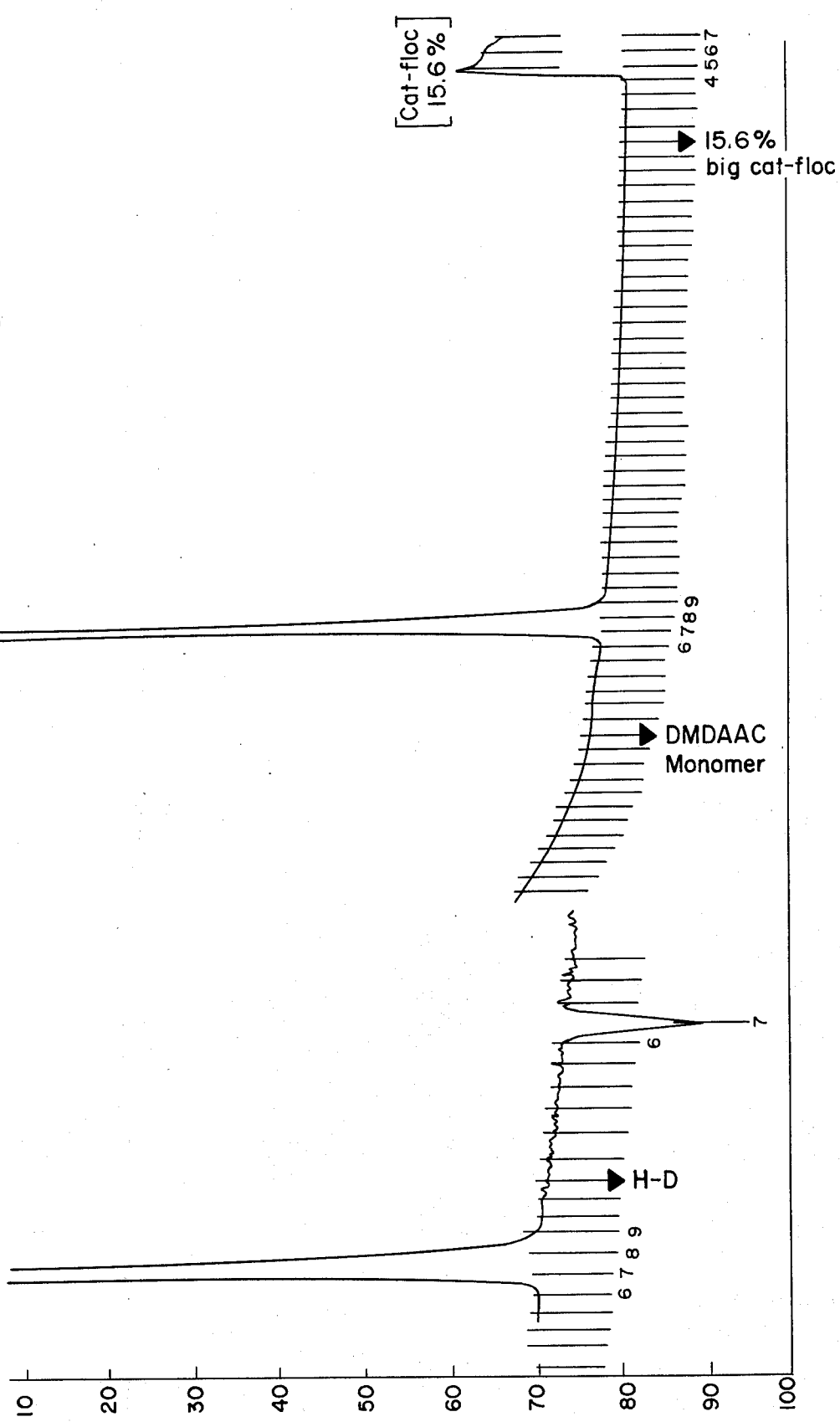

2. Amberlite 904 column. The E-261 sample was eluted over the range of 4 to 9 count with peak maximum at 6 count. The peak from the P112-115 sample was different from that of E-261 in the peak maximum of 4.9 count and in the shape. Again, monomer impurity eluted at 7.6 count (See FIG. 2a, 2b and 2c).

Figure 3:
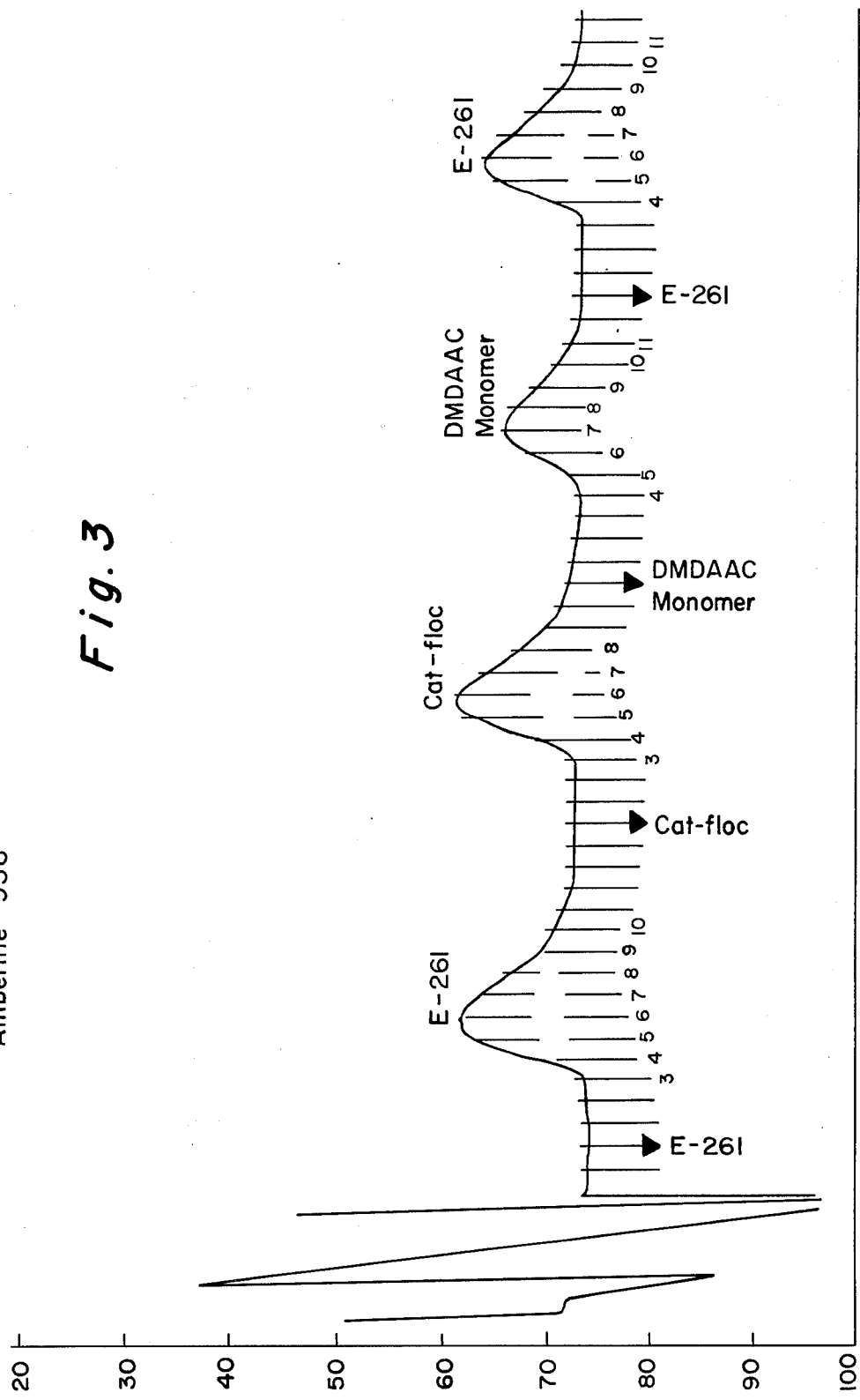

3. Amberlite 938 column. All of the samples, E-261/P112-115, and monomer eluted as rather broad peaks because of the large pore size and large irregular, interstitial volume associated with this gel. However, peak maxima of the three samples were different: E-261 at 6.0 count; P-112-115 at 5.8 count; and monomer at 7.2 count. (See FIG. 3).

4. Amberlite 900, 904, and 938 Columns in Series.

Figure 4B:
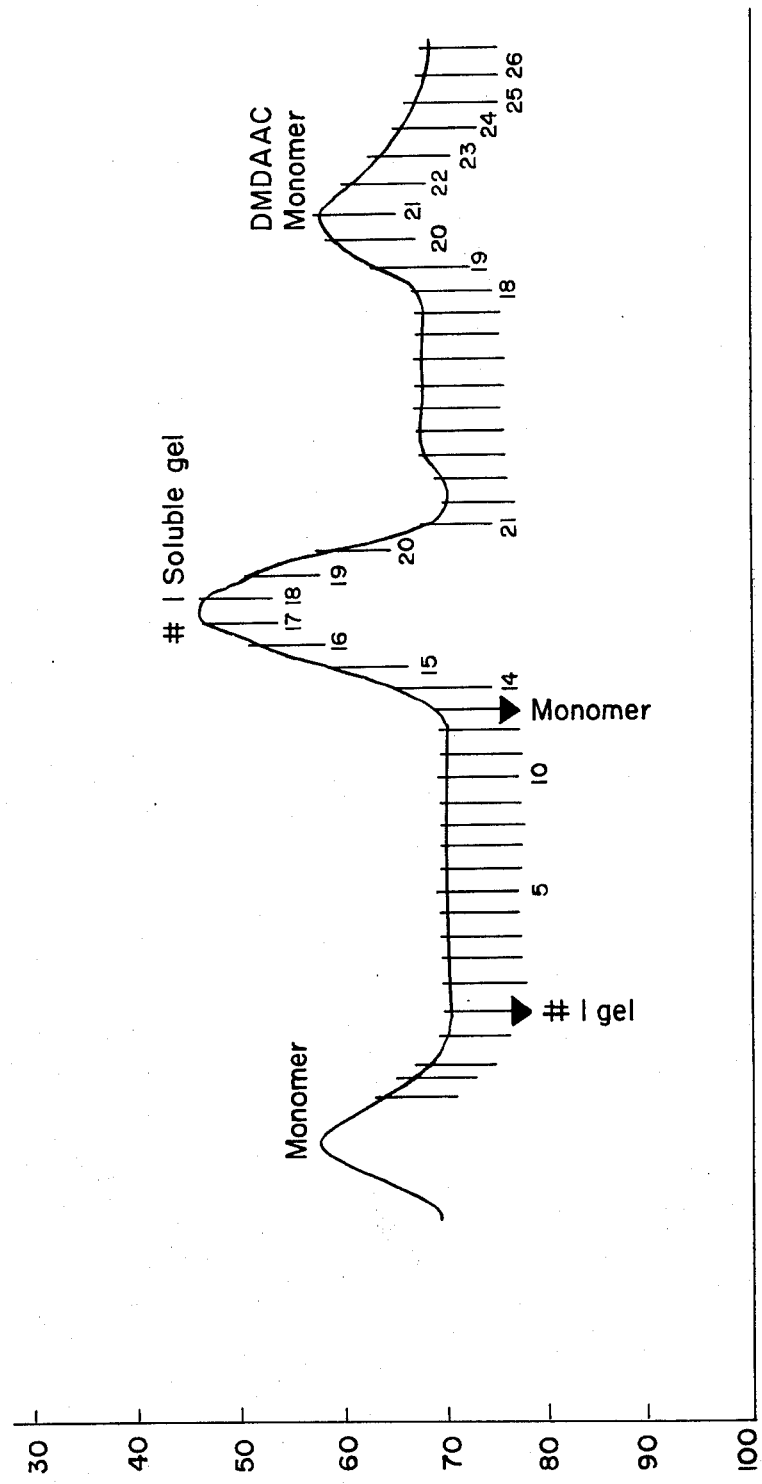

All of the eluted peaks were rather broad due to Amberlite 938 gel. However, peak maxima were: 15.3 for E-261; 14.8 for P112-115; and 20.8 for monomer. Both E-261 and P112-115 exhibited small shoulders at about 20 counts indicating monomer impurity (See FIG. 4a and 4b).

5. Amberlite 900 and 904 Columns in Series.

Samples of E-261 and P112-115 showed clear differences in curve shape and peak maxima in their respective chromatograms (See FIG. 5). E-261 showed a maximum at 10.0 count while P112-115 showed a maximum at 9.0 count. Both samples showed monomer present and eluting at 14.6 count.

It is apparent that each of the gels individually and the various combinations of the gels in series accomplished desired fractionation and separation according to molecular weight.

EXAMPLE 2

The procedure of Example 1 was followed to fractionate a sample of Ionene 805–67, a polymer derived from the reaction of 1,3-dichloropropane and 1,3-di(-dimethylamino) propane, wt. Av. M.W. = $\alpha$ 70,000 $N_w/M_n$ = 2.5.

The sample showed clear peak maxima in the chromatogram.

EXAMPLE 3

The procedure of Example 1 was followed to fractionate a sample of poly(AMBTAC)805-10, a poly (3-acrylamido-3-methylbutyl trimethyl ammonium chloride), having an extremely high average molecular weight and $[\eta] = 77.0$.

The chromatogram showed distinct peak maxima.

EXAMPLE 4

Following is a description of a method of preparing a quaternized styragel and a gel chromatographic process for fractionating polymer systems. A. Preparation of various Samples of Quaternized Styragels a. Chloromethylation of styragels and poragels A 500 ml round-bottom, three-neck flask equipped with stirrer, stopper and reflux condenser cooled by dry-ice and isopropanol was charged with each sample of styragel and chloromethyl methyl ether. Stirring was started and continued for about 40 minutes to swell the gel. The stopper was replaced by a piece of tygon tubing connected to a 25 ml volumetric flask containing anhydrous $ZnCl_2$. A silicon oil bath maintained at 59° C. was raised to heat the reaction flask. The $ZnCl_2$ was gradually added to the flask over a period of about 1 hour. A chocolate brown color developed upon addition of the $ZnCl_2$. The reaction was continued for several hours at reflux temperature after which it was stopped by cooling with an ice-water bath, and injecting, by a syringe, a 1,4-dioxane and water mixture through a rubber septum to destroy the unreacted $ClCH_2OCH_3$ and $ZnCl_2$. (The cooled reaction mixture could also be filtered directly to save the unreacted $ClCH_2OCH_3$ for future use.) The chloromethylated gel was then filtered, washed several times with methanol, and dried in vacuo at 50° C. overnight.

The experimental conditions and results of the chloromethylated samples are summarized in Table 1.

b. Amination of chloromethylated styragels and poragels

The chloromethylated styragel sample and benzene was charged to a 500 ml round-bottom, three-neck flask provided with stirrer and reflux condenser cooled by dry-ice and isopropanol, and the mixture was heated to reflux with stirring for about 1 hour. After the mixture was cooled by ice-water bath to room temperature, the 1:1 $N(CH_3)_3$-THF solution in a 250 ml addition funnel was added dropwise to the stirred reaction mixture over a period of about 1 to 1 and ½ hours. When the addition was completed, the reaction mixture was heated to reflux for about 2 hours, and then allowed to sit overnight at room temperature. The quaternized product was filtered, washed with $CH_3OH$ and dilute HCl solution, and dried in vacuo at 50° C. overnight to give a yellow gel.

The experimental conditions and results of the amination reactions are summarized in Table 2.

B. Efficiency of the Columns Packed with Quaternized Styragels a. Column packing

PROCEDURE

The quaternized gel was swollen in deionized water overnight prior to use. The fines were removed by decantation about three times. The gel was then filtered onto a coarse fritted glass filter. About 100 c.c. of the wet gel was charged to a 250 ml graduated cylinder and balanced with 35 cc. trifluoroethanol and water. Readjustment was usually required until the gel neither floated nor sank in the solution.

The well-balanced gel was added to a packing reservoir which was filled with 0.8 N KCl aqueous solution. A high volume high speed pump was used to pump 0.8 N aqueous KCl solution to pack the column at 700–900 psi. When about 300 cc. of liquid was collected at the exit of the column the packing was stopped. Normal procedure was employed to prepare the column, and special care was exercised to exclude air in the process.

Table 1.

| | | | Chloromethylation of Styragel | | | | | |
|---|---|---|---|---|---|---|---|---|
| Gel Sample No. | Nominal Exclusion Limit (A) | Weight of 100 cc gel (g) | $ClCH_2OCH$ (ml) | Anhydrous $ZnCl_2$ (g) | Reaction time (hr) | Elemental Analyses of the Product (%) | | |
| | | | | | | C | H | Cl |
| 1 | $1 \times 10^6$ | 21.25 | 200 | 7.7 | 2.5 | 84.82 | 7.77 | 5.20 |
| 2 | $1 \times 10^5$ | 16.98 | 125 | 7.5 | 3.5 | 83.30 | 7.52 | 6.88 |
| 3 | $3 \times 10^4$ | 25.93 | 150 | 12.5 | 3.5 | 82.86 | 7.66 | 9.38 |
| 4 | $3 \times 3$ | 44.35 | 180 | 20.0 | 3.0 | 79.22 | 7.34 | 10.66 |
| 5 | 200 | 62.81 | 200 | 24.6 | 3.0 | 73.34 | 8.37 | 13.05 |
| 6 | 60 | 64.00 | 200 | 23.9 | 3.0 | 80.09 | 7.36 | 12.45 |

Table 2.

| | | | | Animation of the Chloromethylated Styragels | | | | |
|---|---|---|---|---|---|---|---|---|
| Gel Sample No. | Original Pore Size (A) | Weight (g) | $N(CH_3)_3$ (ml) | Benzene (ml) | Elemental Analyses of the Quaternized Styragels (%) | | | |
| | | | | | C | H | N | Cl |
| 1 | $(0.7–5.0) \times 10^6$ | 23.80 | 30 | 130 | 76.26 | 7.87 | 0.60 | 7.68 |
| 2 | $(0.5–1.5) \times 10^5$ | 18.40 | 30 | 125 | 67.09 | 6.76 | 0.90 | 12.31 |

Table 2.-continued

Animation of the Chloromethylated Styragels

| Gel Sample No. | Original Pore Size (A) | Weight (g) | N(CH₃)₃ (ml) | Benzene (ml) | Elemental Analyses of the Quaternized Styragels (%) | | | |
|---|---|---|---|---|---|---|---|---|
| | | | | | C | H | N | Cl |
| 3 | (1.5–5.0) × 10⁴ | 22.7 | 40 | 125 | 66.10 | 7.31 | 1.60 | 13.89 |
| 4 | 2000–5000 | 54.2 | 40 | 150 | 70.04 | 7.60 | | 12.72 |
| 5 | 150–350 | 76.4 | 45 | 150 | 73.34 | 8.37 | 3.32 | 11.42 |
| 6 | 50–80 | 79.9 | 45 | 160 | 71.02 | 8.20 | | 12.60 | b. Plate count evaluation

1% DMP (dimethylpiperidinium chloride) solution in 0.8 N aqueous KCl solution was injected 10 sec. into the GPC to perform plate count measurement of each column packed with quaternized gel. The results are summarized in Table 3.

Table 3.

Plate Count of the Columns Packed with Quaternized Styragels and Poragels.

| Sample No. | Nominal Exclusion Limit (A) | Plate Count/ft.* | Delivery Pressure (psi) |
|---|---|---|---|
| 1 | 1 × 10⁶ | 650 | 60 |
| 2 | 1 × 10⁵ | 850 | 50 |
| 3 | 3 × 10⁴ | 460 | 45 |
| 4 | 3 × 10³ | 430 | 35 |
| 5 | 200 | 460 | 30 |
| 6 | 60 | 300 | 35 |
| 1,2,3,4,5 & 6 in series | | 320 | |

*Note plate count = 16 (Ve)²/f (D) where f = column length in feet, Ve = elution count at the peak maximum, D = peak width on the baseline in elution count. 1% DMP was used.

c. GPC fractionation of polyelectrolytes by column packed with quaternized styragels Seven polydimethyldiallylammonium chloride (PDMDAAC) samples of varying intrinsic viscosities, one Ionene 805-67 and one poly(AMBTC) were well fractionated through the four columns packed with quaternized samples 2, 3, 4 and 5 Styragels in series. The results are set forth in Table 4.

TABLE 4

| Elution Count | Relative heights of every half count of the nine GPC curves | | | |
|---|---|---|---|---|
| | PDMDAAL | PDMDAAL | PDMDAAL | PDMDAAL |
| 15.0 | 0 | 0 | 0 | 0 |
| 15.5 | 3 | 0 | 4 | 0 |
| 16.0 | 27 | 0 | 23 | 0 |
| 16.5 | 47 | 0 | 42 | 0 |
| 17.0 | 63 | 8 | 64 | 5 |
| 17.5 | 74 | 19 | 78 | 8 |
| 18.0 | 85 | 38 | 93 | 20 |
| 18.5 | 92 | 50 | 103 | 32 |
| 19.0 | 101 | 70 | 118 | 48 |
| 19.5 | 116 | 89 | 132 | 68 |
| 20.0 | 132 | 116 | 150 | 95 |
| 20.5 | 144 | 133 | 161 | 118 |
| 21.0 | 147 | 143 | 157 | 137 |
| 21.5 | 134 | 143 | 136 | 140 |
| 22.0 | 117 | 133 | 113 | 132 |
| 22.5 | 90 | 116 | 83 | 114 |
| 23.0 | 71 | 96 | 63 | 101 |
| 23.5 | 55 | 76 | 43 | 83 |
| 24.0 | 42 | 53 | 29 | 67 |
| 24.5 | 28 | 36 | 19 | 49 |

TABLE 4-continued

| | Relative heights of every half count of the nine GPC curves | | | |
|---|---|---|---|---|
| 25.0 | 18 | 24 | 13 | 36 |
| 25.5 | 11 | 12 | 8 | 25 |
| 26.0 | 5 | 8 | 4 | 15 |
| 26.5 | 0 | 4 | 3 | 8 |
| 27.0 | 0 | 0 | 0 | 7 |

| Elution Count | PDM-DAAL | Ionene | PDM-DAAL | PDM-DAAL | Poly (AMBTAC) |
|---|---|---|---|---|---|
| 15.0 | 0 | 0 | 0 | 0 | 10 |
| 15.5 | 19 | 0 | 7 | 0 | 75 |
| 16.0 | 35 | 0 | 17 | 0 | 147 |
| 16.5 | 42 | 0 | 30 | 0 | 110 |
| 17.0 | 44 | 0 | 42 | 6 | 85 |
| 17.5 | 47 | 0 | 54 | 10 | 50 |
| 18.0 | 50 | 8 | 65 | 17 | 36 |
| 18.5 | 55 | 23 | 79 | 28 | 27 |
| 19.0 | 58 | 50 | 93 | 48 | 20 |
| 19.5 | 63 | 84 | 108 | 64 | 17 |
| 20.0 | 63 | 117 | 117 | 87 | 13 |
| 20.5 | 57 | 113 | 112 | 98 | 10 |
| 21.0 | 50 | 128 | 101 | 107 | 8 |
| 21.5 | 40 | 113 | 82 | 111 | 7 |
| 22.0 | 30 | 85 | 68 | 114 | 5 |
| 22.5 | 23 | 61 | 51 | 111 | 4 |
| 23.0 | 17 | 43 | 39 | 103 | 3 |
| 23.5 | 12 | 32 | 31 | 80 | 0 |
| 24.0 | 7 | 26 | 20 | 51 | 0 |
| 24.5 | 5 | 22 | 13 | 49 | 0 |
| 25.0 | 0 | 18 | 7 | 22 | 0 |
| 25.5 | 0 | 10 | 5 | 9 | 0 |
| 26.0 | 0 | 5 | 0 | 0 | 0 |
| 26.5 | 0 | 0 | 0 | 0 | 0 |
| 27.0 | 0 | 0 | 0 | 0 | 0 |

What is claimed is:

1. In a gel chromatographic method of fractionating the diverse molecular weight fractions of a polymer system containing ionic functional groups comprising passing a polar solvent solution of said polymer system through a gel chromatography bed of ionic polymer insoluble in but swellable by said polar solvent, the improvement comprising employing as said ionic gel polymer one containing ionic functional groups having the same charge as those in said polymer system.

2. The method of claim 1 wherein said polymer system comprises an aqueous solution of said polymer.

3. The method of claim 1 wherein said diverse molecular weight fractions are successively eluted from said gel chromatography bed and collected.

4. The method of claim 1 wherein said ionic gel polymer is a substantially water-insoluble polymer.

5. The method of claim 4 wherein said ionic gel polymer is a cross-linked polymer.

6. The method of claim 5 wherein said functional groups on said linear polymer are the same or different from the functional groups on said ionic gel polymer.

7. The method of claim 6 wherein said functional groups are cationic.

8. The method of claim 7 wherein the functional groups on at least one of said polymer and ionic gel polymer are quaternary amine groups.

9. The method of claim 7 wherein the functional groups on at least one of said polymer and ionic gel polymer are phosphonium groups.

10. The method of claim 7 wherein the functional groups on at least one of said polymer and ionic gel polymer are sulfonium groups.

11. The method of claim 7 wherein the functional groups on at least one of said polymer and ionic gel polymer are ammonium groups.

12. The method of claim 7 wherein the functional groups on at least one of said polymer and ionic gel polymer are iodonium groups.

13. The method of claim 7 wherein the functional groups on at least one of said polymer and ionic gel polymer are pyryllium groups.

14. The method of claim 6 wherein said functional groups are anionic.

15. The method of claim 14 wherein said functional groups on at least one of said polymer and ionic gel polymer are sulfonate groups.

16. The method of claim 14 wherein said functional groups on at least one of said polymer and ionic gel polymer are phosphate groups.

17. The method of claim 14 wherein said functional groups on at least one of said polymer and ionic gel polymer are phosphite groups.

18. The method of claim 14 wherein said functional groups on at least one of said polymer and ionic gel polymer are carboxylate groups.

19. The method of claim 7 wherein said polymer is poly(dimethyldiallyl) ammonium chloride.

20. The method of claim 7 wherein said ionic gel polymer is polystyrene which has been chloromethylated and aminated with trimethyl amine.

* * * * *